US009811536B2

(12) United States Patent
Morris et al.

(10) Patent No.: US 9,811,536 B2
(45) Date of Patent: Nov. 7, 2017

(54) CATEGORIZING CAPTURED IMAGES FOR SUBSEQUENT SEARCH

(71) Applicant: Dell Software, Inc., Round Rock, TX (US)

(72) Inventors: Cheryl Morris, San Jose, CA (US); Gabriel M. Silberman, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 70 days.

(21) Appl. No.: 15/007,919

(22) Filed: Jan. 27, 2016

(65) Prior Publication Data

US 2017/0212910 A1    Jul. 27, 2017

(51) Int. Cl.
*G06K 9/00* (2006.01)
*G06F 17/30* (2006.01)
*G06K 9/62* (2006.01)
*G06T 3/40* (2006.01)
*G06T 7/00* (2017.01)

(52) U.S. Cl.
CPC .... *G06F 17/30256* (2013.01); *G06F 17/3028* (2013.01); *G06F 17/30268* (2013.01); *G06K 9/6267* (2013.01); *G06T 3/40* (2013.01); *G06T 7/004* (2013.01)

(58) Field of Classification Search
None
See application file for complete search history.

(56) References Cited

U.S. PATENT DOCUMENTS 7,565,139 B2 *  7/2009  Neven, Sr. ........... G06K 9/6807
                                                     455/3.01
8,374,646 B2 *  2/2013  Shirai .................... G06T 11/60
                                                     455/556.2

(Continued)

*Primary Examiner* — Soo Park
(74) *Attorney, Agent, or Firm* — Campbell Stephenson LLP; Shiv S. Naimpally

(57) ABSTRACT

Systems and methods are described to identify in the images text, people, landmarks, objects, or any combination thereof and to store and search for images based on extracted data. A portable computing device, such as a wireless phone or tablet computer, may capture an image, determine context data associated with the image, and send the image and context data to an analyzer. The analyzer may extract data from the image and send the extracted data to the portable computing device. For example, the analyzer may determine if the image includes alphanumeric characters and perform character recognition (e.g., using optical character recognition (OCR) or similar technology). A format of the characters that are recognized in the image may be analyzed to determine additional information, such as whether the characters are a phone number, a uniform resource locator (URL), a name of a person, a name of a location, or the like. The analyzer may determine if the image includes a person, a landmark, an object, etc. by comparing at least a portion of the image with other images. The analyzer may send the extracted data to the portable computing device for storage. The portable computing device may associate the context data and the extracted data with a downsampled (e.g., thumbnail) version of the image to enable a user to query the context data and extracted data.

20 Claims, 7 Drawing Sheets

(56) References Cited

U.S. PATENT DOCUMENTS

| | | | | |
|---|---|---|---|---|
| 9,165,406 B1* | 10/2015 | Gray | .................. | G06K 9/00456 |
| 9,451,219 B2* | 9/2016 | Paalasmaa | ............. | G01C 21/20 |
| 9,459,889 B2* | 10/2016 | Huang | .................. | G06F 3/0481 |
| 2008/0240702 A1* | 10/2008 | Wassingbo | ............ | G11B 27/105 |
| | | | | 396/310 |
| 2009/0237546 A1* | 9/2009 | Bloebaum | ............... | G06F 3/011 |
| | | | | 348/333.01 |
| 2010/0316300 A1* | 12/2010 | Epshtein | ............. | G06F 17/3089 |
| | | | | 382/229 |
| 2011/0131241 A1* | 6/2011 | Petrou | ............... | G06F 17/30861 |
| | | | | 707/770 |
| 2011/0145068 A1* | 6/2011 | King | .................... | G06F 17/211 |
| | | | | 705/14.55 |
| 2012/0087537 A1* | 4/2012 | Liu | .................... | G06K 9/00469 |
| | | | | 382/100 |
| 2012/0290601 A1* | 11/2012 | Huang | ............... | G06K 9/00469 |
| | | | | 707/769 |
| 2016/0048298 A1* | 2/2016 | Choi | .................. | G06F 3/04842 |
| | | | | 715/846 |
| 2016/0104052 A1* | 4/2016 | Kim | .................... | G06K 9/2081 |
| | | | | 382/176 |

* cited by examiner

CATEGORIZING CAPTURED IMAGES FOR SUBSEQUENT SEARCH

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Due to the recent proliferation of camera-equipped mobile devices (e.g., smartphone, tablet, smart glasses, etc.), individuals are generating large volumes of images during their daily lives. For example, a user may take an image with other people at a business meeting. As another example, a user may take an image of a product to be acted upon at later time, e.g., for further research or purchase. However, personal devices such as mobile phones are generally not the ideal place to store large number of images, because storage space on such devices is limited. When large numbers of images are saved, a user who captured the images may find it time consuming and tedious to look through the images at a later time for a desired subject matter or to file and categorize the images.

SUMMARY

This Summary provides a simplified form of concepts that are further described below in the Detailed Description. This Summary is not intended to identify key or essential features and should therefore not be used for determining or limiting the scope of the claimed subject matter.

Systems and methods are described to receive an image, identify data, such as text, people, landmarks, objects, or other types of information, included in the image and store the information with the image for subsequent retrieval. A portable computing device, such as a wireless phone or tablet computer, may capture an image, determine context data associated with the image, and send the image and context data to an image analyzer. The analyzer may extract data from the image and send the extracted data to the portable computing device. For example, the analyzer may determine if the image includes alphanumeric characters and perform character recognition (e.g., using optical character recognition (OCR) or similar technology). A format of the characters that are recognized in the image may be analyzed to determine additional information, such as whether the characters are a phone number, a uniform resource locator (URL), a name of a person, a name of a location, or the like. The analyzer may determine if the image includes a person, a landmark, an object, etc. by comparing at least a portion of the image with other images (e.g., stored in an image database). The analyzer may send the extracted data to the portable computing device for storage. The portable computing device may associate the context data and the extracted data with the image or a downsampled (e.g., thumbnail) version of the image to enable a user to create a query that searches the context data and extracted data to identify relevant images.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
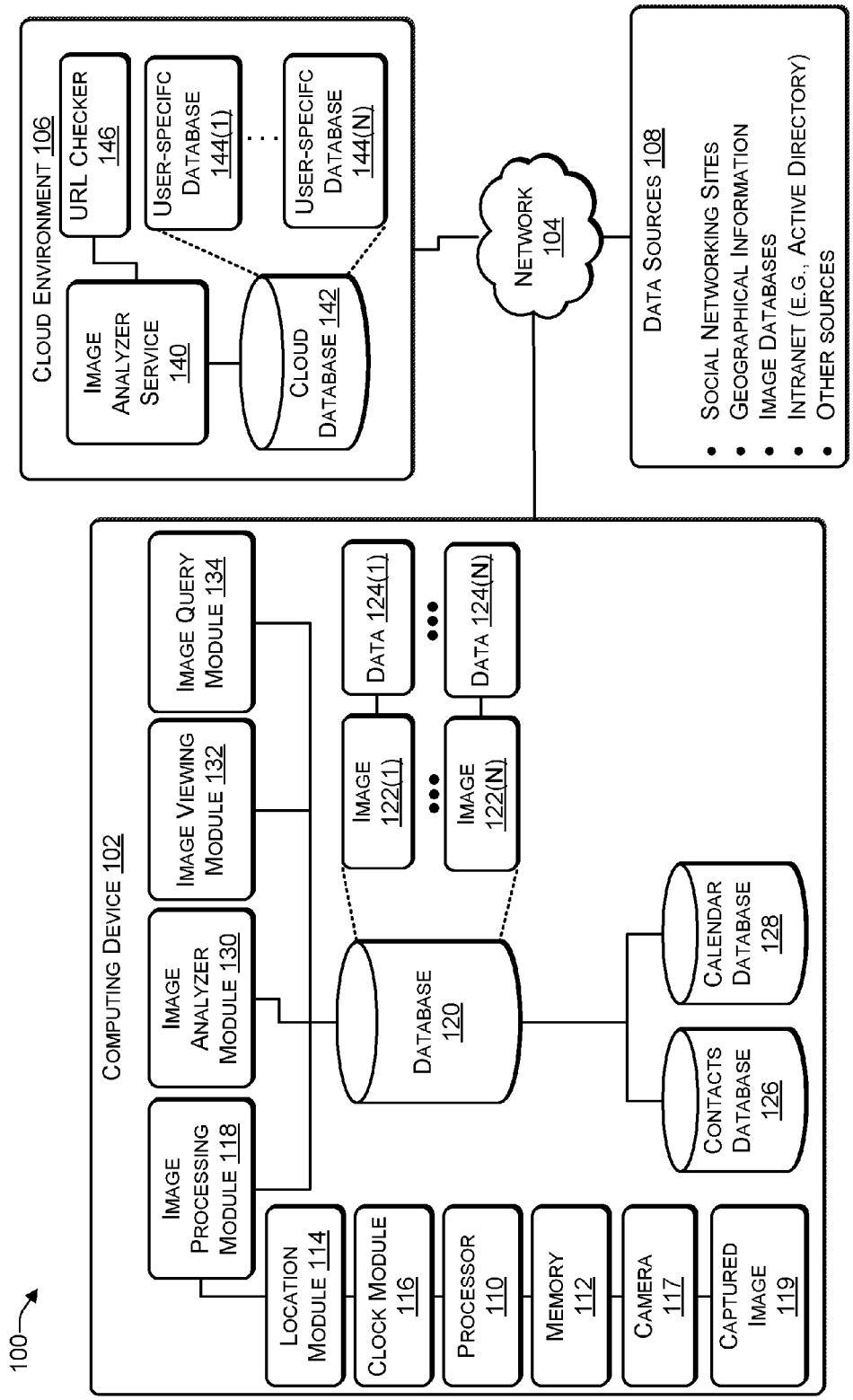
FIG. 1 is a block diagram illustrating a computing system that includes a computing device and image analyzer service, according to some examples.

For purposes of this disclosure, a computing device may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a computing device may be a mobile device (e.g., smartphone, tablet, smart glasses), a personal computer (e.g., desktop or laptop), or any other suitable device and may vary in size, shape, performance, functionality, and price. The computing device may include memory resources such as random access memory (RAM), read-only memory (ROM), and/or other types of nonvolatile memory; one or more processing resources such as a central processing unit (CPU) or hardware or software control logic; one or more storage devices; and one or more network interface for communicating with external networks as well as various input and output (I/O) devices.

Systems techniques are described herein to determine and store context data and extracted data for images. For example, a camera on a computing device may capture an image. Context data, such as the time (e.g., a timestamp that includes the date and time) and a location (e.g., based on GPS or other data) at which the image was captured, may be determined by the computing device. In addition, extracted data may be determined based on the image data and the context data. In some cases, at least a portion of the data extraction may be performed on the computing device. Further, data extraction may be carried out by an image analyzer, which may be executed by the computing device or may be a web service hosted on a remote website (e.g., a cloud-based computing environment). The image analyzer may analyze an image to determine the type of recognizable subject matter within the image and a position (e.g., location) of the subject matter within the image. For example, an image may include text (e.g., a street sign) at a first location in the image and a historical landmark at a second location in the image. The image analyzer may extract (e.g., using OCR) the text from the first location and determine that the extracted text is a street address (e.g., "1600 Pennsylvania Avenue"). The image analyzer may compare the portion of the image that includes the historical landmark with other images to determine that landmark is "the White House." The extracted information and context information may be stored in a database (e.g., local or cloud-based) that is accessible to the computing device for subsequent search. For example, if a user of the computing device poses a query such as "Where was I on Jan. 16, 2016?", "What landmark is at 1600 Pennsylvania Avenue?", "When did I visit Washington, D.C.?", "When did I visit the White House?" or the like may each result in the search results including the image of the White House, the context data (e.g., GPS data associated with the location and a timestamp including the date and time when the image was captured), and the extracted data (e.g., text extracted using OCR from a street sign and recognition from the White House landmark).

For some types of extracted data, additional processing may be performed. For example, if extracted data includes text (e.g., alphanumeric characters), a determination may be made whether the text is of the form of a regular expression, such as a universal resource locator (URL), a phone number, a universal product code (UPC), a street name, or the like.

Extracted data and context data may be used to create tags that are associated with the image to enable searches to be performed. A tag can include text associated with subject matter included in an image. For example, an image including a street sign of "Pennsylvania Ave." may extract the data "Pennsylvania Avenue" from the image and associate the tag "Pennsylvania Avenue" with the image. As another example, an image with context data that includes global positioning system (GPS) data indicating that the image was captured in Los Angeles may be associated with the tag "Los Angeles."

After extracting data from an image, the analyzer may determine if the extracted data is actionable and associate one or more actions that may be performed by a computing device using the extracted data. For example, the analyzer may determine that the extracted data in an image includes text that matches the regular expression corresponding to a URL. The analyzer may associate an action with the URL, such as launching a browser application and navigating the browser application to the URL.

In some cases, an image analyzer service may receive images from multiple users and maintain a database for each individual user. A user account may include user-specific data such as a user profile with preferences, and/or user history data.

The image analyzer service may determine that the image includes different types of data (e.g., text-based data, facial data, landmark data, etc.) and use additional data sources to extract additional data from the image. For example, the analyzer may use facial recognition to compare a face in an image with facial images in a data source such as a social networking site (e.g., Facebook®, LinkedIn®, an intranet directory or the like) to identify a name associated with the face. In some cases, additional data from the social networking site may be used to populate tags associated with the face, such as the individual's name and email address. The image analyzer may use additional data sources to determine additional information associated with the extracted data. For example, for a URL, the image analyzer service may initiate resolving the URL against a domain name server (DNS), to verify whether the URL is valid. Further, the image analyzer may look up the URL against a public list of unsafe websites. In some cases, not all the text extracted from an image may be recognizable. For example, the image quality, lighting, or size of the text in the image may cause some characters to be unrecognized or misrecognized. To illustrate, one or more of "1, " "I," or "!" may be misrecognized. The analyzer may attempt to resolve the misrecognition or ambiguity in extracted text by performing a search using a wildcard in place of the misrecognized or unrecognized character(s), rank the results, and select the highest ranked result. The analyzer may mark the tag as including potentially misrecognized or unrecognized text. After receiving the tags from the analyzer service, the computing device may display the tags and highlight the tags with potentially misrecognized or unrecognized text to enable a user to confirm the selection of the highest ranked result or correct the tag.

Images may be associated with context data and extracted data and stored in a local database on the computing device, in a remote database (e.g., hosted by a remote server or in a cloud-based environment), or both. In some cases, to save space in the database, a thumbnail may be generated by downsampling the image, the context data and extracted data may be associated with the thumbnail, and the thumbnail, along with the context data and extracted data, may be stored in the database. For example, because memory on portable computing devices (e.g., tablet computers, wireless phones, or the like) is limited, a thumbnail (with the associated context data and extracted data) may be stored in a local database on a portable computing device, while the full resolution image may be stored on the remote database. The size of images stored in a database, either locally, remotely, or both, may be determined based on user preferences specified in a user profile.

The computing device may be capable of displaying images and tags generated based on the context data and the extracted data. In some cases, the computing device may display an action that can be performed to a tag, enabling the user to select the action, instructing the computing device to perform the action using the tag. For example, an image that includes a URL may be displayed with an action to open a browser and navigate the browser to the URL. As another example, an image that includes a phone number may be displayed with an action to initiate a phone call to the phone number. As yet another example, an image that includes a physical address may be displayed with an action to open a mapping application and display the location of the physical address. As a further example, an image that includes the face of an individual whose name is included in a contact list stored on the computing device may be displayed with an action to initiate a phone call to the individual or create a message (e.g., email or text message) addressed to the individual. As yet another example, an image that includes a product with a UPC may be displayed with an action to navigate a browser to an online store to enable the product to be purchased.

Further, the computing device enables a user to create a text-based query to search the tags created based on the context data and extracted associated with the images. The query results may be ranked and displayed according to a relevance score. The relevance score may be calculated based on the number of factors, such as the number of matched parameters and the relative importance of matched parameters.

FIG. 1 is a block diagram illustrating a computing system that includes a computing device and image analyzer service, according to some examples. The computing system 100 may include a computing device 102, a cloud environment 106, and other data sources 108. These elements are equipped with network interfaces to communicate over a network 104. Network 104 may include a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet, and the like.

The computing device 102 may be any one of different types of devices. For example, the computing device 102 may be a mobile device (e.g., smartphone, tablet, smart glasses), a personal computer (e.g., desktop or laptop), or any other suitable device and may vary in size, shape, performance, functionality, and price. The computing device 102 may include a memory 112 such as random access memory (RAM), read-only memory (ROM), and/or other types of non-transitory storage media or memory devices. The computing device 102 may include one or more processors 110 such as a central processing unit (CPU) and/or hardware or software control logic. Additional components of the computing device 102 may include one or more storage devices, one or more network interfaces for communicating with external networks as well as various input and output (I/O) devices.

The computing device 102 may include a number of software modules, hardware modules, or both to support the operation of the computing device 102. For example, the computing device 102 may include a location module 114, which is capable of determining the location of the computing device 102 at a given time. For example, the location module 114 may include a global positioning system (GPS) module capable of determining global positioning information, a short-range location determining system employing a short-range radio frequency technology (e.g., Bluetooth® or similar technology), another type of location determining system that can determine the location of the computing device 102, or any combination thereof. The computing device 102 may include a clock module 116. The clock module 116 may determine a current timestamp that includes date information (e.g., day, month, and year) as well as time information (e.g., hour, minute, second) and provide the timestamp to other modules. For example, each time the computing device 102 is used to capture the captured image 119, a current location may be determined using the location module 114 and associated with the captured image 119. As another example, each time the computing device 102 is used to capture the captured image 119, a current timestamp may be determined using the clock module 116 and associated with the captured image 119.

The computing device 102 may include a built-in image capture unit, such as a camera 117. The camera 117 may capture the image 119 or video (e.g., a stream of multiple images), and save the captured image 119 to a memory of the computing device 102. In one example, the camera 117, the location module 114, and the clock module 116 may work together such that at the time the captured image 119 is captured, the time and location of the computing device 102 is captured with the captured image 119.

The computing device 102 may include an image processing module 118. The image processing module 118 may be capable of processing (e.g., encoding and compression) on the captured image 119 to convert the image 119 into a particular image format (for example, a Joint Photographic Experts Group (JPEG) format) to be stored into memory. The image processing module 118 may associate metadata 124 (e.g., context data) with the processed image, such as, for example, the location and time associated with when the captured image 119 was captured, information about the user or the device (such as a user identifier (ID) or device ID), information about the camera 117, particular settings (e.g., shutter speed, aperture, etc.) of the camera unit, and other environmental conditions (e.g., lighting conditions, distance of subject matter, etc.).

The image processing module 118 may process the captured image 119 before storing the captured image 119 in the database 120. For example, the image processing module 118 may process the captured image 119 to generate an image, such as a thumbnail for each image that is captured (e.g., the captured image 119). For example, the processed images may be generated by downsampling the captured image 119 to produce a smaller, lower-resolution image (e.g., image 122(1)). In some cases, the image processing module 118 may crop the captured image 119 by selecting relevant portions (e.g., portions of the image from which data 124 can be extracted) of the image and discarding remaining portions of the image (e.g., portions of the image that do not include data 124 that can be extracted). These techniques may be combined with other techniques (e.g., reducing a number of colors use in the image) to create an image (e.g., the image 122(1)) that is smaller in size than the captured image 119. The size of the image 122(1) generated from the captured image 119 may be determined by a user interface associated with the image processing module 118, and may depend on factors, such as the storage capacity or remaining available space of a storage of the computing device 102 (or image database 120). For example, the size of the images 122(1) to 122(N) may be automatically reduced when the remaining available space of memory of the computing device 102 or the database 120 falls below a predetermined threshold. In some cases, the images 122(1) to 122(N) that are smaller in size than the captured image 119 may be saved along with the captured image 119. Alternatively, the images 122(1) to 122(N) may be saved on the computing device 102, while the captured image 119 may be saved in a remote database, such as cloud database 142. In some cases, the database 120 may store a link (e.g., a URL) to the image, along with associated data 124.

The database 120 may be accessible to the computing device 102. For example, the database 120 may reside physically in the computing device 102, or on another device that is accessible via the network 104. The database 120 may store multiple images, such as the images 122(1) to 122(N), as well as data 124(1) to 124(N) corresponding to the images 122(1) to 122(N). In some cases, the images 122(1) to 122(N) may be reduced in size as compared to the corresponding captured images (e.g., the captured image 119) and the database 120 may include links to the corresponding captured images. The database 120 may be organized as a table-based SQL database, an object-oriented database, a file system, or other type of data storage schema. The database 120 may support any of a number of data access interfaces, such as SQL queries, form-based queries, or queries via application programming interfaces.

The database 120 may include references to or copies of data from other databases. For example, the computing device 102 may have access to a contacts database 126 that stores contact information, such as phone numbers, email address, physical addresses and other contact information associated with multiple people. The contact information stored in the contact database 126 may be referenced by or copied to the database 120. As another example, the computing device 102 may have access to a calendar database 128 that stores calendar information such as events and meetings for one or more users. Again, the information may be referenced by or copied to the database 120. Thus, images in database 120 may be associated with data from the contacts database 126 and calendar database 128. For example, an image may be automatically associated with a calendar entry, such as "Jun. 1 to 3, 2015—Vacation in Spain."

The computing device 102 may include an image analyzer module 130. The image analyzer module 130 may determine context data and extracted data for a captured image (e.g., the captured image 119) and associate the context data and extracted data 124 with the images 122 when they are stored in the database 120. The image analyzer module 130 may extract data from the captured image 119 to create extracted data 124. For example, the image analyzer module 130 may use OCR software to recognize text included in the captured image 119. In some cases, the image analyzer module 130 may send the captured image 119 to a remote service for processing, in order to generate other extracted data from the captured image 119. For example, the computing device 102 may send the captured image 119 to the image analyzer service 140 and the image analyzer module 130 may extract first particular data 124 from the captured image 119 while the image analyzer service 140 extracts second particular data 124 from the captured image 119. To illustrate, the image analyzer module 130 may use OCR to extract text from the captured image 119 while the image analyzer service 140 identifies objects, people, or both in the captured image 119 using image recognition, facial recognition, or the like.

The computing device 102 may include an image viewing module 132 to view the images 122 saved in database 120. For example, the imaging viewing module 132 may display (e.g., on a display device associated with the computing device 102) one or more of the images 122 along with the corresponding data 124 (e.g., including context data, extracted data, or both). For example, the image viewing module 132 may be capable of displaying data 124, such as a subject matter type, a portion of an associated tag, subject matter, and the like associated with the captured image 119. Subject matter types represent categories of subject matter, and may be used to indicate what a particular subject matter is (e.g., text-based data, facial data, landmark data, etc.). In some cases, when the user moves a pointer to a position that is proximate to the subject matter displayed on a display device, the image viewing module 132 may pop up a window displaying the subject matter type and associated tag. The image viewing module 132 may indicate one or more actions associated with the subject matter. When the user selects an action associated with the subject matter, the computing device 102 may initiate performing the action. For example, the viewing module 132 may enable a user to call "Bob Jones" by clicking on one of the images 122 that includes a face of Bob Jones.

As another example, the captured image 119 may include a URL. The capture image 119 may be downsampled and stored as the image 122(N). The image analyzer module 130 may determine that the captured image 119 includes text and may extract the text. The image analyzer module 130 may determine that the extracted text matches the regular expression of a URL. When the image 122(N) is viewed via the image viewing module 132, the software may display a visual indication (e.g., a box) around the URL, indicating that the URL is a subject matter with associated extracted data 124. When the user hovers a pointer near the box or selects the box, a popup window may appear next to the box showing the subject matter type "URL" and the text of the URL. The URL may be displayed as a clickable link, or alternatively, the popup window may include a user interface (UI) element (e.g., a button). If the link or the button is clicked, the image viewing module 132 may launch a web browser and navigate the browser to the URL.

The image viewing module 132 may allow the user to add, delete, or modify the data 124 (e.g., context data and extracted data) associated with the images 122. The image viewing module 132 may display an edit command in a menu. When selected, the edit command may cause a user interface to be displayed to enable the user to view and edit (e.g., change) the corresponding context data and extracted data 124 associated with the captured image 119. For example, the user may use the edit command to remove portions of extracted data 124 associated with a subject matter, or modify particular portions of the data 124, such as the contents of a tag. The changes made by the user may be saved to the database 120, the cloud database 142, or both.

The computing device 102 may include an image query module 134. The image query module 134 may include software to enable a user to query the data 124 in the database 120 to retrieve the images associated with the data 124. For example, the image query module 134 may present a user interface enabling a user to construct a query specifying particular keywords or values as search criteria. The keywords and or values may be matched against data 124 associated with the images. The query may be executed against the data 124 stored in the database 120 to identify zero or more results. The query may be a fuzzy query that returns results that do not completely satisfy every criteria specified by the query. The results of the query may be ranked and displayed (for example as a list of thumbnails) according to a relevance score. The relevance score may be calculated based on a number of factors, such as the number of matched parameters and the relative importance of matched parameters. The relevance score may depend on settings specified in a user profile. For example, a user may indicate that images with matched dates should rank higher than images with matched locations. The image query module 134 may launch the image viewing module 132 to allow a user to view one of the results returned from the query. The image query module 134 may operate on the computing device 102 or another computing device that has access to database 120.

The image analyzer module 130 on the computing device 102 may use the image analyzer service 140 to determine extracted data associated with a particular image. While the image analyzer module 130 is illustrated in FIG. 1 as being hosted by the cloud environment 106, in some cases the image analyzer service 140 may be executed by the computing device 102 (e.g., and may execute when the computing device 102 is in a low power mode). The image analyzer service 140 may extract data 124 from images, including extracting text and recognizing people or objects included in the images. The image analyzer service 140 may run a background process that periodically checks for new images placed at a specified location, and processes the new images. The image analyzer service 140 may expose a predefined call interface that receives the captured image 119 along with any associated context data 124, and return one or more predefined result data structures representing the extracted data 124. The call interface may expose additional interactions with the image analyzer service 140, or additional functionality implemented by the image analyzer service 140. In addition, the image analyzer service 140 may present different call interfaces for different types of subject matter. For example, a call to submit an image associated with the subject matter "license plate" may require additional parameters such as "state." The extracted data 124 returned via the call may include a special data structure including the "make" and "model" of a car. The special parameters may be defined in the special call interface for recognition of "license plates."

In one embodiment, the image analyzer service 140 may use a URL checker 146. The URL checker 146 may be a software module or a separate device or service. The URL check 146 may attempt to resolve the URL extracted from the captured image 119 against a domain name server (DNS), to verify that the URL is a valid URL.

The URL checker 146 may provide a user with a user interface to enable the user to correct a potentially misspelled URL. In some cases, the URL checker 146 may automatically detect and suggest a correction for a misspelled URL. For example, not all the text extracted from an image may be recognizable. To illustrate, the image quality, lighting, or size of the text in the image may cause some characters to be unrecognized or misrecognized. To illustrate, one or more of "1, " "I," or "!" may be misrecognized. The analyzer may attempt to resolve the misrecognition or ambiguity in extracted text by performing a search using a wildcard in place of the misrecognized or unrecognized character(s), rank the results, and select the highest ranked result. The analyzer may mark the data 124 as including potentially misrecognized or unrecognized text. After receiving the data 124 from the analyzer service 140, the computing device may display the data 124 and highlight the tags with potentially misrecognized or unrecognized text to enable a user to confirm the selection of the highest ranked result or correct the data 124. For example, the image analyzer service 140 may determine that an extracted URL "www.amozon.com" is a possible misspelling of "www.amazon.com". In response, the suggested correct spelling of the URL is provided to the user.

Further, the URL checker 146 may look up the URL against a public list of unsafe websites. Alternatively, the URL checker 146 may obtain a risk rating for the URL using a malware detection or protection tool or service or a user-specified safe/unsafe list. If the URL is indicated to be unsafe, the user may be alerted with a warning in the extracted data 124. Alternatively, the URL checker 146 may instruct the image analyzer service 140 to not recognize the unsafe URL.

The image analyzer service 140 may be supported by an underlying cloud database 142. The cloud database 142 may reside in the same cloud environment 106 as the servers hosting the image analyzer service 140, or in a remote environment accessible to the image analyzer service 140. Cloud database 142 may store some of the submitted images from computing devices such as computing device 102.

Cloud database 142 may include a plurality user-specific databases 144(1) to 144(N) to store the images received from computing devices of multiple users, along with associated image context and extracted data 124. Alternatively, the cloud database 142 may store links to the images (e.g., as URLs) instead of the actual images. The database 142 may be organized as a table-based SQL database, an object-oriented database, a file system, or other type of data storage schema. The database 142 may support any of a number of data access interfaces, such as SQL queries, form-based queries, or queries via application programming interfaces.

The image analyzer service 140 may maintain user accounts associated with a plurality of users. The image analyzer service 140 may require a user ID and a password before initiating any interaction with client software such as the image analyzer module 130, image viewing module 132, and image query module 134 of computing device 102. User account data may be stored in the user-specific databases 144(1) to 144(N). A user account may include user-specific data such as a user profile with preferences data, and user history data including a history of a user's interactions with the image analyzer service 140. User preference data and user history data may be used during the image recognition process. For example, a user may specify a preference to never attempt to recognize certain types of subject matter under certain circumstances (e.g., never attempt to recognize landmarks in photos captured near the user's home). As another example, if a user's history indicates that the user always erases extraction data 124 associated with a subject matter type (e.g., the user's own company's logo), the image analyzer service 140 may refrain from recognizing the logo in the user's images in the future.

The image analyzer service 140 may use other data sources 108 during the image recognition process. The other data sources 108 may reside in the same cloud environment 106 as the servers hosting the image analyzer service 140, or in a remote environment accessible to the service. For example, a database of photos maintained by a social networking site may be used to recognize a particular individual in a received image. In this situation, other data from the social networking site may be used to populate a data 124 associated with the individual, for example, with the individual's name and email address. For example, the image analyzer service 140 may determine that a person in the captured image 119 is a friend of the user who submitted the image, based on photos stored on a social networking website. In response, the image analyzer service 140 may create a tag with the friend's name and email address, and associate that tag with the person in the captured image 119. In another example, company directories such as an Intranet Active Directory database may be used to populate a tag with a co-worker's contact information. Third party image libraries or databases may be used to generate or refine extracted data 124. For example, an image database of exotic cars may be used to first recognize and then populate tag information for an image of a car. In addition, news feeds or Twitter® tweets may be used to create appropriate tags for an image. For example, the image analyzer service 140 may create a tag indicating a news media story concerning Inauguration Day and associate the tag with an image capture that day of the Mall of Washington.

Figure 2:
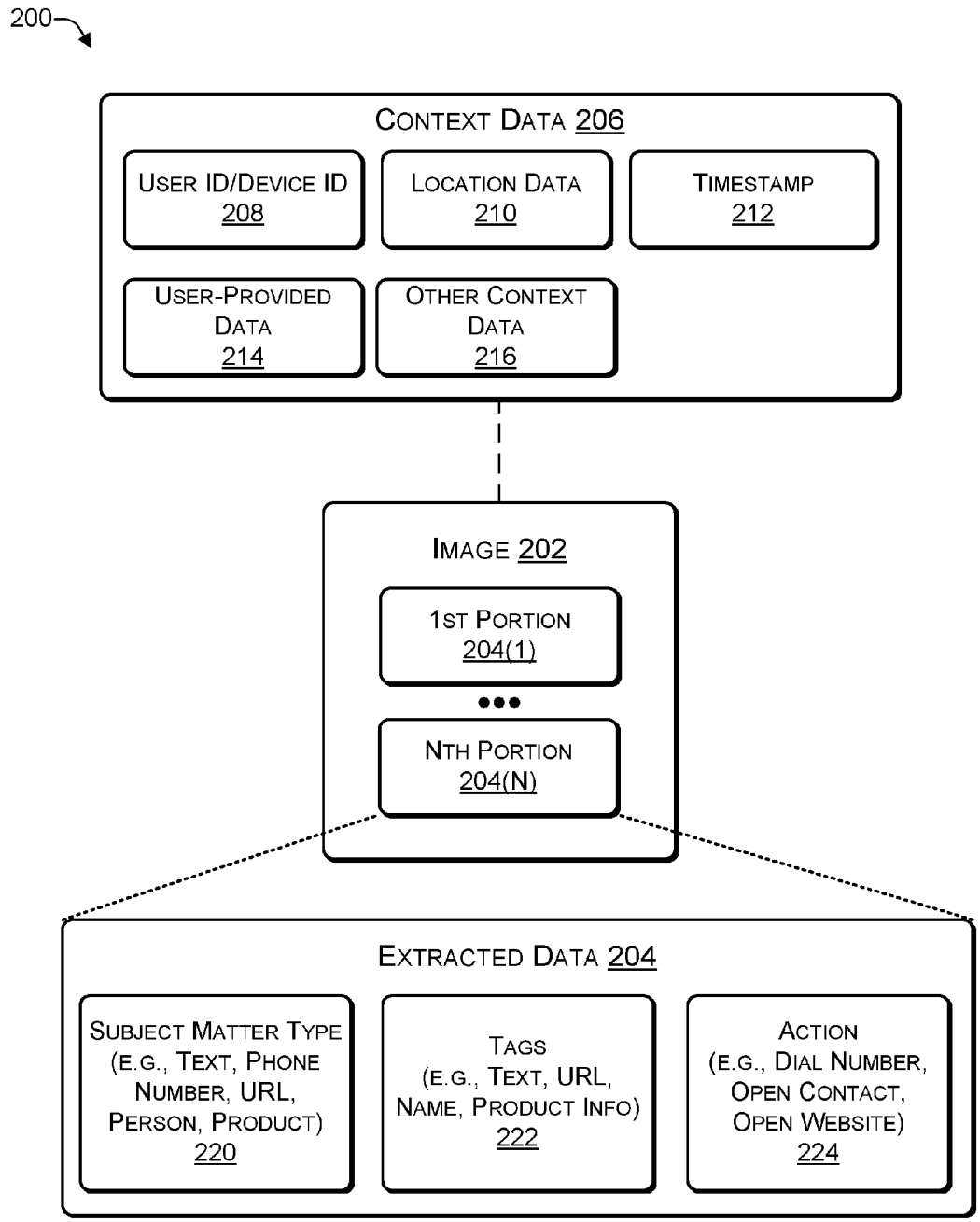
FIG. 2 is a block diagram illustrating the data structures associated with an image according to some examples.

FIG. 2 is a block diagram illustrating the data structures associated with an image according to some examples. For example, image 202 may include one or more portions 204(1) to 204(N), which may be associated with subject matter. Moreover, the image 202 may be associated with context data 206. The data may be stored in database 120 or cloud database 142.

Context data 206 may be generated by software or hardware on the computing device 102. For example, the timestamp 212 and location 210 of an image's capture may be generated by the camera 117, in conjunction with the location module 114 and/or the clock module 116 on the computing device 102. A user ID or device ID 208 can be obtained from the computing device 102 and associated with an image. Further, certain user-provided data 214 may be added by a user. For example, a user may indicate that an image is associated with a particular event such as "Bob's birthday." The description may be saved as part of the context data 206. The computing device 102 may determine other context data 216, based on the capabilities of the computing device 102. For example, the computing device 102 may associate an image with a calendar entry (e.g., "vacation in Spain"), or with an accompanying task or email (e.g., "research project").

Extracted data 204 may be generated based on the image 202 and the context data 206. For example, the computing device 102 may generate some extracted data 204, such as OCR data. In addition, the image analyzer service 140 may examine an image to determine a type and position of a particular subject matter within the image 202. The subject matter type 220 of the subject matter may be for example a text, phone number, URL, person, co-worker, landmark, product, etc. For example, specialized software may be able to recognize with some degree of certainty that a particular shape in an image is a human face. OCR software may detect that there is recognizable text embedded in an image. Some types of subject matter, such as human faces or landmarks, may be recognized by matching the image with other images of faces or landmarks. The position of the subject matter may be a data representation of an area on the image where the subject matter approximately appears. The position may be associated with a portion 204(N) in the image, and can be represented as a pixel position within the image 202 with a radius, or an area defined by a polygon, or even the entire image 202.

The image recognition may be carried out based in part on the context data 206. For example, an image of the Eiffel Tower may be recognized based in part on the context data that the image was captured at a particular location in Paris. The context data may be used to confirm a questionable recognition (perhaps due to poor image quality), or to speed up the recognition process (e.g., narrowing down matching images to only landmarks in Paris).

For some types of subject matter, additional processing may be performed on the extracted data 204. For example, once subject matter of an image is recognized as text, the subject matter may be checked to see if the text is a particular subtype of text, such as a phone number or a URL. The image analyzer service 140 may check the text against a library of text patterns, and determine if a match is found. The text patterns may be specified in, for example, regular expressions. Regular expression patterns may be used to identify various subtypes of text, such as URLs, phone numbers, email addresses, dates, street addresses, IP addresses, social security numbers, license plates, ISBN numbers, monetary amounts, and the like. Further, the image analyzer service 140 may allow a user to define custom subject matter types using custom regular expressions. For example, a user may define a text pattern to recognize a document code that is used in a particular company.

Extracted data 204 may include one or more tags 222, which includes textual data associated with a subject matter. The textual data may be a text or URL, a name associated with a person, or information associated with a product or landmark. For example, an image including the word "Hollywood" may be associated with the tag "Hollywood." Tags 222 may include information inferred from the context data 206. As an example, the image analyzer service 140 may associate an image taken in Los Angeles with the tag "Los Angeles." A tag 222 may be a represented in multiple ways, including a concatenation of different text values, or a plurality of fields for the different text values. A tag 222 may include other information, such as formatting, links (e.g., URLs), media content (e.g. clipart or sound), or controls for performing associated actions.

Extracted data 204 may include one or more actions 224 that may be performed by a computing device. Actions 224 may include a variety of functions. For example, the extracted data 204 may indicate that an individual "Bob Jones" is included in the image 202. The extracted data 204 may indicate that an action 224 may be associated with "Bob Jones," such as dialing a phone number corresponding to Bob Jones. In another example, the extracted data 204 may indicate that a URL is included in the image 202. The extracted data 204 may indicate that an action 224 to be performed with respect to the URL is to launch a browser application and retrieve information related to the URL. As a further example, a landmark in the image 202 may be associated with an action 224 to open mapping application or webpage displaying the location of the landmark. As yet another example, an image that includes a product with a UPC may be displayed with an action 224 to navigate a browser to an online store to enable the product to be purchased.

As a further example, the image 202 may include the contents of a regularly formatted form, for example a bank statement, which represents a type 220 of recognizable subject matter for the image analyzer service 140. The fields on the form may be recognizable types 220 to the image analyzer service 140. For example, the image analyzer service 140 may be able to recognize all the transactional amounts on the bank statement. An action 224 may be defined for the "bank statement" subject matter type, to extract all of transactional amounts from the image, and then place them into a spreadsheet.

In some cases, an action 224 may be performed based on input received by the computing device 102. To illustrate, the computing device 102 may receive data indicating a selection of the action via an input device of the computing device 102. In other cases, the action 224 may be triggered by an event. In an illustrative example, upon the displaying an image of Bob Jones, the computing device 102 may indicate that there is a new voicemail from Bob Jones, and prompt the user to play the voicemail.

Figure 3:
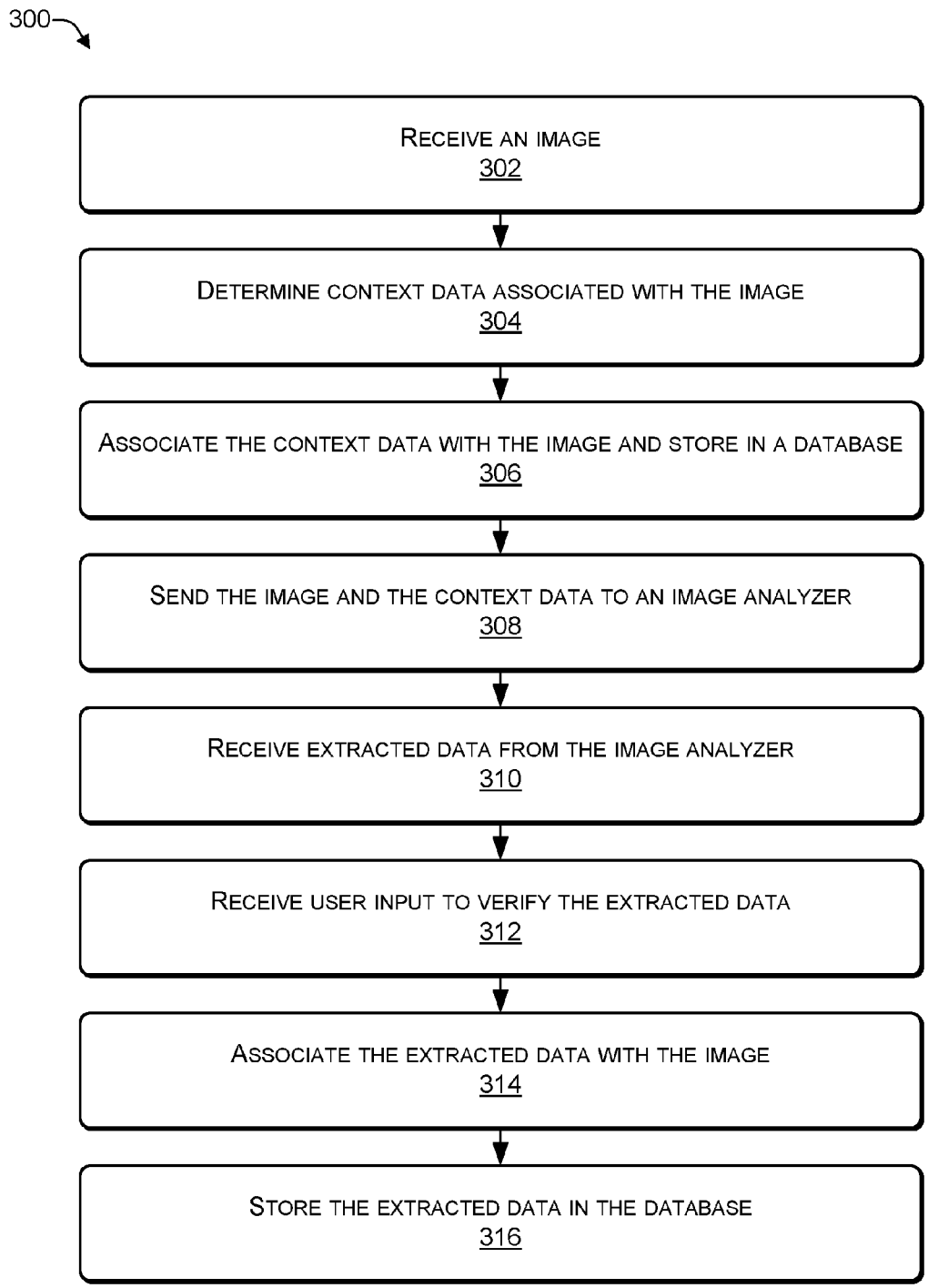
FIG. 3 is a flowchart of a process that includes determining and storing extracted data associated with an image, according to some examples.

FIG. 3 is a flowchart of a process that includes determining and storing extracted data associated with an image, according to some examples. The process may be performed by the computing device 102 of FIG. 1.

At 302, an image is received. The image may be received by the computing device 102 in a number of ways. For example, the camera 117 on the computing device 102 may capture an image. Alternatively, an image may be a screen capture by the computing device 102. Alternatively, the image may be received as an attachment to an email. Alternatively, the image may be received from an external storage device, such as a USB drive or a Secure Digital (SD)

card. The image may be part a standalone file or a part of larger file, such as frame in a video file or a slide in a presentation.

At 304, context data is determined for the image. As discussed above, context data may include data such as the time and location of the image's capture, which can be obtained from a location module 114 or a clock module 116. Context data 206 may include a user ID or device ID associated with the computing device 102. The user ID or device ID may be the same user ID or device ID that is specified in a user account stored with the image analyzer service 140. Context data 206 may be manually specified by the user or determined from other sources such as a calendar entry or an accompanying email. The image analyzer module 130 may gather the context data 206, and associate the context data 206 with the image.

At 306, the received image is stored in a database. The database may be the database 120, which may be part of the computing device 102, or accessible from computing device 102. The image may be stored in the cloud database 142. Alternatively, the image may be stored in the cloud database 142, while a link to the image is stored in database 120.

At 308, the image and context data 206 is sent to an image analyzer. The image analyzer may be an image analyzer service 140 in a remote cloud environment 106, as described above. The image analyzer may be software that provides functionality through an interface, such as API, a web service, an email-based service, or a file-based service. Moreover, the image analyzer may be a service that is not explicitly invoked. For example, the image analyzer service 140 may be a background process that periodically checks if new images files are stored in a file system or a database, such as database 120 or 142, and periodically performs the described functions on any new images.

At 310, extracted data is received from the image analyzer. The extracted data 204 may comprise one or more subject matter types 220 found in an image, and associated positions, tags 222, and actions 224, as described above. The extracted data 204 may be received as a direct response to a call to the image analyzer service 140. The extracted data may be received via a delayed callback, where the calling software had previously registered with the image analyzer service 140 to receive the callback. Alternatively, the image analyzer service 140 may have access to the database 120 or cloud database 142, and simply update the database with the extracted data 204.

At 312, user input to verify the extracted data 204 is received. For example, after the extracted data 204 is received from the image analyzer service 140, the computing device 102 may prompt a user with the received information, and allow the user to verify, reject, or modify the information. Alternatively, the image analyzer service 140 may alert the user (via for example a registered email address) that extracted data 204 has been updated for one or more of the user's images. In response to the alert, the user may review the extracted data 204 from the computing device 102 or some other computing device. For example, the user may indicate that the image analyzer service 140 correctly recognized Bob Jones in an image. The user may indicate that the image analyzer service 140 mistakenly recognized the Seattle Space Needle for the Eiffel Tower in a second image. The user may elect to simply keep or erase some extracted data 204, without indicating whether the data is correct or incorrect. The user's indications and modifications may be transmitted back to the image analyzer service 140, which may in turn save the information in the user history or preferences data, which may be used in future image recognitions. For example, if a user's history indicates that the user always erases extracted data 204 associated with a subject matter type (e.g., the user's own company's logo), the image analyzer service 140 may refrain from recognizing the logo in the user's images in the future.

At 314, the extracted data 204 is associated with the image. The association may be accomplished by, for example, the image analyzer module 130 or the image analyzer service 140, as described above. Alternatively, in the case that the image is actually stored in another database (e.g., the image comes from a user's account on a social media website), the social media website's database may be updated with the extracted data 204, to the extent the database is supported to receive the data.

At 316, the extracted data 204 is saved to a database. The database may be the database 120 or the cloud database 142, or some third party database configured to receive the data, as described above.

Figure 4:
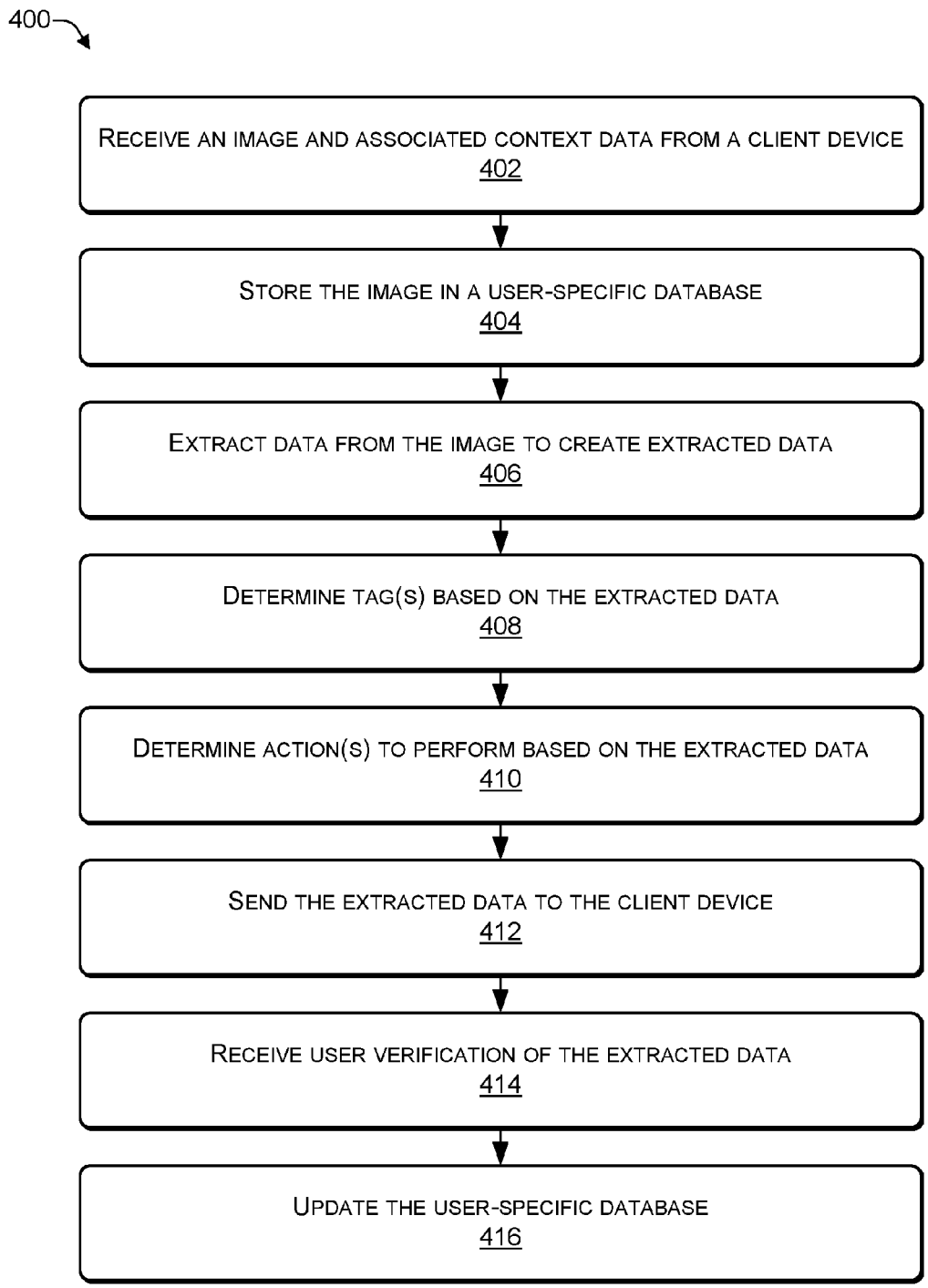
FIG. 4 is a flowchart of a process that includes determining and storing extracted data associated with an image, according to some examples.

FIG. 4 is a flowchart of a process that includes determining and storing extracted data associated with an image, according to some examples. The process may be performed by image analyzer service 140 in the computing environment 106 of FIG. 1, for example.

At 402, an image with context data 204 is received from a client device. The client device may be the computing device 102 described above, or another computing device. The image may be received directly via a call from a software module from the client device. The call may be invoked as a result of an explicit user request. Alternatively, the image may be detected at a predetermined location, for example a database or file system, which is regularly monitored by a monitoring module, for example the image analyzer service 140.

At 404, the image is stored to a user-specific database. The user-specific database may the user-specific database 144(1) to 144(N) in FIG. 1 described above. The user-specific database may be one of a plurality of user-specific databases stored in a cloud environment 106, which includes servers that maintain user accounts corresponding to the user-specific databases 144(1) to 144(N). In one scenario, the stored image is a copy of an image that is stored elsewhere, such as a database 120 associated with the computing device 102 as described above. In another scenario, the user-specific database stores a link to the image that refers to the actual location of the image, which may reside remotely.

At 406, subject matter type(s) 220 are determined from the image. The determination may be carried out by the image analyzer service 140 as described above, which analyzes the image data to determine the types 220. A single image may include a plurality of recognizable subject matter, and thus a plurality of different subject matter types 220. The subject matter type 220 may be determined in part based on the context data 206 or the user preference or history data stored in the user-specific database 144(1) to 144(N). For example, the user preference data may include certain user-defined subject matter types, e.g., "family" that can be used during the recognition process.

For some types of subject matter, additional processing may be performed to determine a subtype. For example, once a subject matter is recognized as text, the subject matter is further checked to see if it is a particular subtype of text, such as a phone number or a URL. For example, the text may be checked against a library of text patterns to determine whether the text matches a particular pattern indicating a subtype. The text patterns may be specified in, for example, regular expressions. Subtypes for text includes for example, URLs, phone numbers, email addresses, dates, street addresses, IP addresses, social security numbers, license plates, ISBN numbers, monetary amounts, and the like. Further, the image analyzer service 104 may allow a user to define custom subject matter types using custom regular expressions. For example, a user may define a text pattern to recognize a document code that is used in a particular company.

At 408, one or more tags 222 are determined based on the subject matter type 220, context data 206, user preference and history information, and other data sources 108, as described above. For example, an image taken in Los Angeles may be associated with a tag "Los Angeles." Further, depending on the determined subject matter type, the image analyzer service 140 may perform additional processing to generate specialized tags, including for example querying additional information sources for further data or submitting the image to a more specialized image recognition program or service. For example, a subject matter type of "business card" may cause the image to be submitted to a specialized service for recognizing business cards, to obtain a specialized tag including the contact information from the image.

At 410, one or more actions 224 are determined based on the subject matter type 220, context data 206, user preference and history information, and other data sources 108, as described above. For example, a subject matter type "URL" may be associated with an action 224 to visit the URL. As another example, a user's preference may indicate that for some persons the preferred contact action is to dial a phone number, while for other persons the preferred action is to create an email.

The other data sources 108 may be used to perform processing on the extracted data. For example, for a URL, the image analyzer service 140 may attempt to resolve the URL against a domain name server (DNS), to verify that the URL is a valid URL. Further, the image analyzer service 140 may look up the URL against a public list of unsafe websites, or obtain a risk rating for the URL using a malware detection or protection tool or service or a user-specified safe/unsafe list. If the URL appears to be an unsafe website, a warning may be included in the extracted data 204.

At 412, the extracted data 204 is sent to a client device. The transmission may be accomplished via a response to a call to a client software module, or a callback to a previously registered client, or placing the extracted data in a predetermined place, such as a database or a file system location that is accessible by the client.

At 414, a verification of the extracted data 204 is received. The verification may be a confirmation that a portion of the extracted data 204 is correct, or a rejection of a portion of the extracted data 204, or simply an instruction to keep or discard the extracted data 204 without confirmation or rejection.

At 416, the user-specific database 144(N) is updated. The updated data may include the verified extracted data 204, including the verified subject matter types 220, tags 222, actions 224, and/or other associated data. Moreover, any user activity data and the received verification data may be stored as user history associated with a user account, and the information can be used in the analysis of future images. For example, over time, a user-specific database may build up a number of images including verified recognitions of a particular person. The images may be used to better recognize the person in future images. Moreover, some images with extracted data 204 may be made public, so they may be used by the image analyzer service 140 to interpret the images of other users. Thus, for example, the image analyzer 140 service may build up a library of images of the Eiffel Tower, and the images can be used to better recognize the Eiffel Tower in images from other users. As another example, the image analyzer service 140 may recognize a celebrity in an image by matching the image to other images provided by other users, taken at around the same time and around the same location, that include verified extracted data 204 associated with that celebrity.

Figure 5:
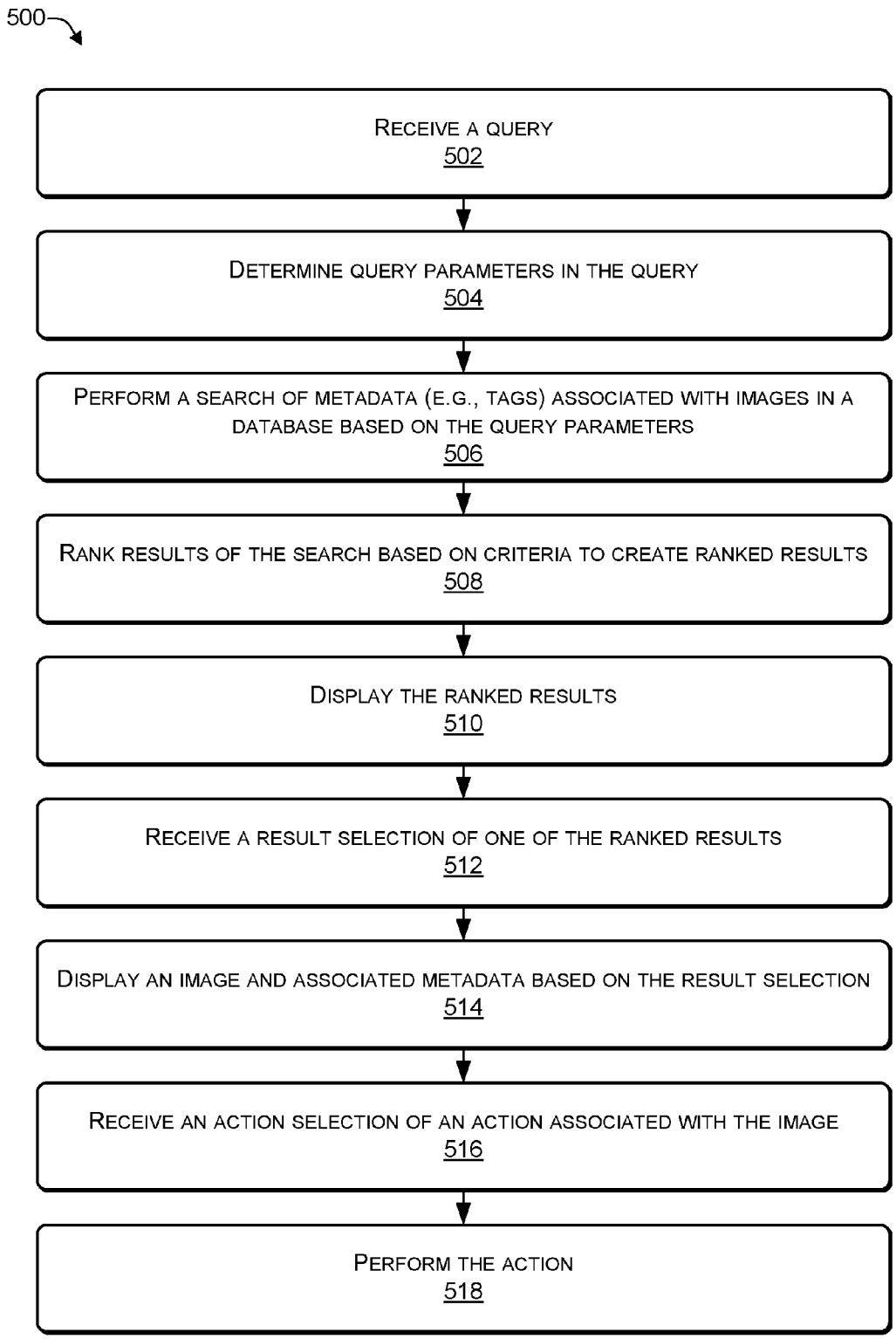
FIG. 5 a flowchart of a process that includes performing a query of an image database, according to some examples.

FIG. 5 is a flowchart of a process that includes performing a query of an image database, according to some examples. The process may be carried out by the image query module 134, as described above, or by software located on another computing device that has access to database 120 or cloud database 142.

At 502, a query is received. The query may be represented in any format, including for example a SQL query or some other query language, or a data structure submitted via a programmatic call. The query may be a one-time query generated by a user, a programmatically generated query, or a query that is repeatedly executed over a period of time.

At 504, the query's parameters are determined. The determination may be performed by a database (for example database 120) or a data access module (for example the image query module 134) that implements a translation between the query and the underlying database query language. For example, in the case of a SQL query, a SQL database may parse the query to determine the query parameters.

At 506, a search is performed of the metadata associated with the images stored in a database, based on the query parameters. For example, the keywords and or values found in the parameters may be matched against data 124 associated with the images in the database. The database may be database 120 or cloud database 142 as described above. The metadata may be the image context data 206, extracted data 204, or other data associated with the images stored in the database. The search may be carried out by the search engine of the database, or by software outside the database itself.

At 508, results from the search are ranked based on a variety of criteria. The ranking may be performed by the database search engine, or by other software, for example the image query module 134. The results may be ranked according a variety of ranking criteria. For example, a relevance score of each result may be computed. The relevance score may be calculated based on the number of factors, such as the number of matched parameters and the relative importance of matched parameters. The relevance score may depend on settings specified in a user profile. For example, a user may specify that images with matching extracted data type of "URL" are ranked higher than images with matching extracted data type of "text." The ranking criteria may be user-specified through the user interface of the querying software, for example the image query module 134.

At 510, the results are displayed in rank order. The displaying may be performed through a second user interface of the image query module 134. Alternatively, the results may be displayed as a webpage or in an email. The result images may be displayed using lower-resolution images 122(1) to 122(N) associated with the images, along with other information associated with the images. For example, the result list may display one or more tags 222 associated with each image.

At 512, a selection of one of the results is received. The selection may be a user selection on the displayed list of results in a user interface, for example the user interface of image query module 134.

At 514, the selected image is displayed, along with associated metadata. The displayed metadata may include at least a portion of the context data 206, extracted data 204, or other data associated with the image 202. In one example, the image 202 is displayed using the image viewing module 132 as described above. The image viewing module 132 may show an extracted data type 220 and/or at least some portion of a tag 222 associated with a subject matter when the user pointer travels into a position proximate to the subject matter.

At 516 and 518, a selection of an action 224 associated with the selected image is received, and in response to the selection, the selected action 224 is performed. For example, the image viewing module 132 may show an action 224 associated with a subject matter. When a user click is detected within a position associated with the subject matter, the image viewing module 132 may cause the action 224 to be performed. For example, the image viewing module 132 may allow a user to place a phone call Bob Jones by clicking on the face of Bob Jones in the image 202. As another example, the image viewing module 132 may allow a user to follow a URL by clicking on a URL in the image 202. If a URL was determined to be unsafe by URL checker 146 as described above, the action 224 may be disabled, or the URL may be displayed with a visual indication (e.g., a red box or colored text), alerting the user that the URL is not safe.

Figure 6:
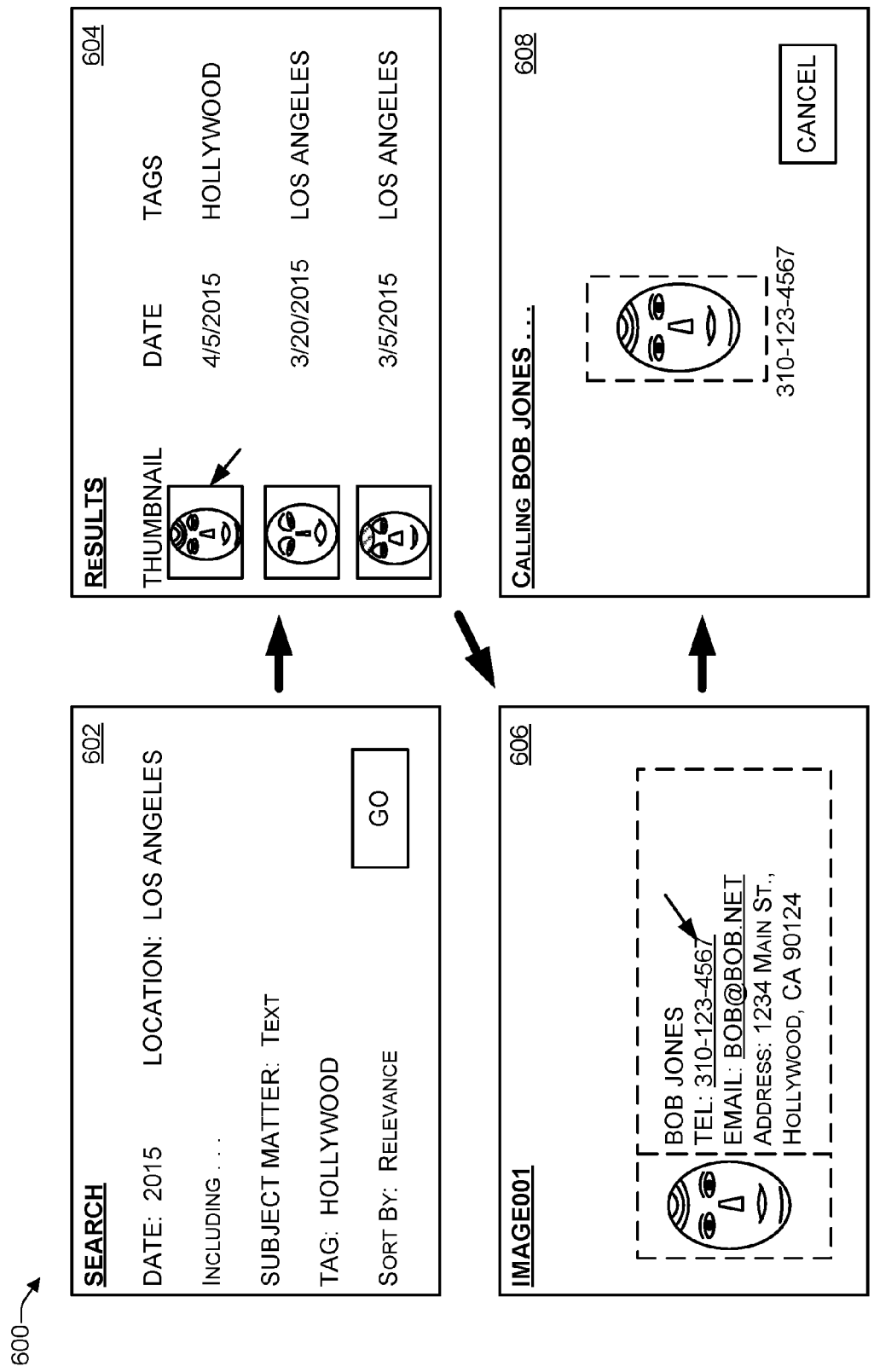
FIG. 6 illustrates a series of example screenshots capturing a user interaction for performing a query of an image database, according to some examples.

FIG. 6 illustrates a series 600 of example screenshots of user interfaces capturing a user interaction for performing a query of an image database, according to some examples. The screenshots may be displayed, for example, by the image query module 134 and/or the image viewing module 132.

In a first user interface 602, an example user interface for a query is shown. The query user interface may include fields to enter values for query parameters. For example, as shown, a query is constructed for images capture during 2015, in Los Angeles, including text "Hollywood," and sorted by "relevance."

In a second user interface 604, an example user interface for a search result is shown. The results may be generated by a search of the keywords and or values found in the query parameters, which may be matched against data 124 associated with the images stored in database 120 or cloud database 142. The results may be presented as a list sorted according to rank order. The results may be shown with each image's corresponding lower-resolution image 122(N) and other data (for example date and tags) associated with the image. Each entry in the result list may be selectable, and when selected, the full image can be viewed.

In a third user interface 606, an example user interface for viewing an image is shown. The image may be shown with metadata such as context data 206 and extracted data 204. For example, as shown, the image includes the text "Hollywood," which is highlighted with a visual indication such as a box, indicating that the text is associated with extracted data 204. The image includes a visual indication around a person, along with additional information associated with the person. In this example, the recognized person is Bob Jones, and the person's name and contact information, possibly saved as part of one or more tags 222 associated with the person in the image, is displayed. In addition, some items in the displayed contact information are indicated to be clickable, indicating that actions 224 are associated with the items. In this example, the displayed phone number is associated with an action 224 to call the number, and the displayed email address is associated with an action 224 to email that address.

In a fourth user interface 608, an example user interface for performing an action 224 is shown. As explained, actions 244 associated with an image can be invoked and performed. For example, if the phone number in user interface 606 is clicked, the phone call may be initiated to the displayed phone number. In one embodiment, the computing device 102 operating the image viewing module 132 is also a phone.

Figure 7:
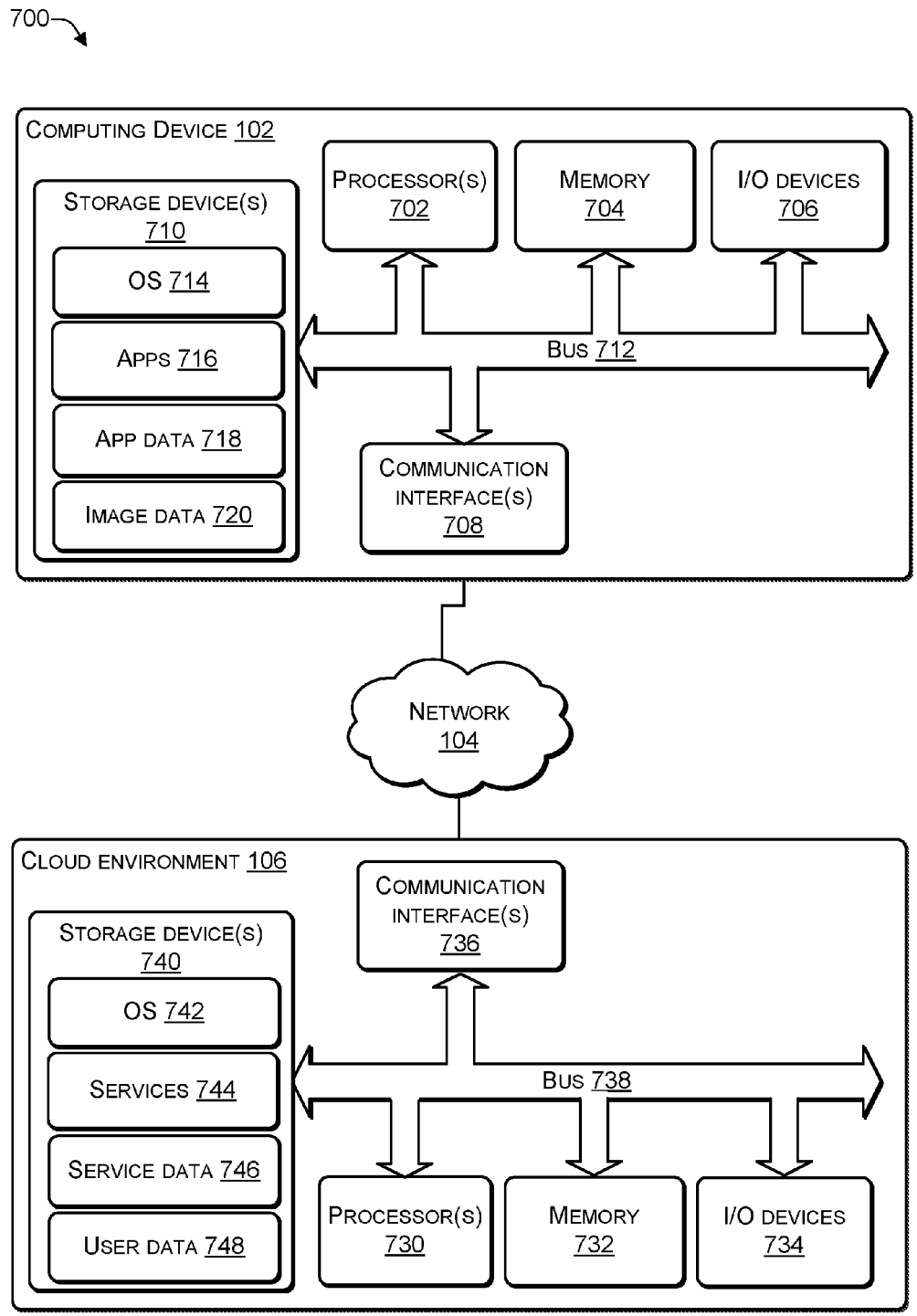
FIG. 7 illustrates an example configuration of a computing device and a cloud environment that can be used to implement the systems and techniques described herein.

FIG. 7 illustrates an example configuration of a computing device and cloud environment that can be used to implement the systems and techniques described herein, such as the computing device 102 and cloud environment 106 of FIG. 1. The computing device 102 may include at least one processor 702, a memory 704, other input/output (I/O) devices 706, communication interfaces 708, and one or more storage devices 710, configured to communicate with each other, such as via a system bus 712 or other suitable connection.

The processor 702 is a hardware device that may include a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 710, or other computer-readable media.

Memory 704 and storage devices 710 are examples of computer storage media (e.g., memory storage devices) for storing instructions which are executed by the processor 702 to perform the various functions described above. For example, memory 704 may generally include both volatile memory and non-volatile memory (e.g., RAM, ROM, or the like) devices. Further, storage devices 710 may include hard disk drives, solid-state drives, removable media, including external and removable drives, memory cards, flash memory, floppy disks, optical disks (e.g., CD, DVD), a storage array, a network attached storage, a storage area network, or the like. Both memory 704 and storage devices 710 may be collectively referred to as memory or computer storage media herein, and may be a media capable of storing computer-readable, processor-executable program instructions as computer program code that can be executed by the processor 702 as a particular machine configured for carrying out the operations and functions described in the implementations herein.

The input/output (I/O) devices 706 are devices that enable the computing device 102 to interact with its environment. I/O devices 706 include for example, a display device to display information to a user and a keyboard or a touch screen to receive user input. I/O devices 706 may include a location module 114 as shown in FIG. 1, which may comprise a GPS module. I/O devices may include a camera 117 as shown in FIG. 1, which is capable of capturing images such as captured image 119.

The computing device 102 may include one or more communication interfaces 708 for exchanging data via the network 104 with for example the cloud environment 106. The communication interfaces 708 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 708 can provide communication with external storage (not shown), such as in a storage array, network attached storage, storage area network, or the like.

The storage devices 710 may include and operating system 714 (OS), one or more apps 716, app data 718, and image data 720. The operating system 714 may be system software that manages computer hardware and software resources and provides common services for computer programs that operate on the computing device 102. The operating system 714 may be for example a version of the Android, iOS, or Windows operating system.

The apps 716 may be one or more computer programs that operate on the computing device 102. Apps 716 may include software for performing a variety of function, such as sending and receiving emails, making phone calls, and maintaining and/or updating user contact information or calendar information. Apps 716 may implement one or more of the modules shown in FIG. 1, such as the image processing module 118, image analyzer module 130, image viewing module 132, and image query module 134.

The app data 718 may include data that is used by the apps. For example, for a calendaring app, the app data 718 may include a user's calendar entries. For a contacts app, the app data 718 may include a user's saved contacts. The app data may include configuration settings and user preference settings for apps. The app data may be saved in application databases such as databases 126 and 128 as shown in FIG. 1.

The image data 720 may be stored in database 120, as described above. The database 120 may be organized as a table-based SQL database, an object-oriented database, a file system, or other type of data storage schema. The database 120 may support any of a number of data access interfaces, such as SQL queries, form-based queries, or queries via application programming interfaces.

The cloud environment 106 may include one or more computers accessible via the network 104. Each computer may include at least one processor 730, a memory 732, other input/output (I/O) devices 734, communication interfaces 736, and one or more storage devices 740, configured to communicate with each other, such as via a system bus 738.

In the cloud environment 106, the storage devices 740 may include different software, including an OS 742, services 744, service data 746, and user data 748. The OS 742 may be any operating system suitable for supporting the services hosted by the computers in the cloud environment 106. The OS 742 can be, for example, a version or variant of the UNIX operating system or the Windows operating system.

The storage devices 740 may include services 744, which operate to provide services to one or more clients such as computing device 102. One example of a service is a web server. For example, the image analyzer service 140 shown in FIG. 1, may be implemented as a web service that can be invoked through a web server. As another example, one of the services 744 may provide access to a database, such as the cloud database 142 shown in FIG. 1. The service may allow a client to add, remove, or modify image data stored in the cloud database 142.

The storage devices 740 may include user data 748. User data 748 may include data that is specific to a user who is registered to use one or more of the services 744. The user data 748 may include accounts for each registered user. An account may include information such as a user's profile, user preferences, and user history. In one implementation, images submitted by a user are stored in a user-specific database 144(N) that is associated with the user account.

Software modules described herein may include one or more of applications, bytecode, computer programs, executable files, computer-executable instructions, program modules, or code expressed as source code in a high-level programming language such as C, C++, or Perl, or a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various examples of the method and apparatus of the present disclosure have been illustrated herein in the Drawings and described in the Detailed Description, it will be understood that the disclosure is not limited to the examples disclosed, and is capable of numerous rearrangements, modifications and substitutions without departing from the scope of the present disclosure.

What is claimed is:

1. A computer-implemented method, comprising:
   receiving an image;
   determining context data associated with the image;
   storing the image and the context data in a local database;
   sending the image and the context data to an image analyzer;
   receiving, from the image analyzer, extracted data that is determined based on the image and based on a user profile that includes user preferences specifying types of data that are not to be extracted from the image, the extracted data comprising a type of a recognized subject matter included in the image, a tag associated with a recognized subject matter, and an action associated with the recognized subject matter in the image;
   reducing a size of the image to create a thumbnail of the image by performing at least one of downsampling the image, cropping the image, or reducing a number of colors in the image;
   associating and storing the extracted data with the thumbnail in the local database;
   receiving a query;
   determining results of the query from the local database; and
   displaying the results.

2. The computer-implemented method of claim 1, further comprising:
   capturing the image using a computing device, and wherein the context data is determined using at least one of the following components on the computing device: a clock, a GPS device, a Bluetooth positioning device.

3. The computer-implemented method of claim 1, wherein the image analyzer determines extracted data based on information from other data sources, including one or more of a social media database, a company directory, a map database, a website, an image library, or a news feed.

4. The computer-implemented method of claim 1, further comprising:
receiving user verification of the extracted data associated with the image; and
sending the user verification to the image analyzer.

5. The computer-implemented method of claim 4, wherein the action associated with the recognized subject matter is one of: initiating a call to a phone number; creating an electronic communication to a person; navigating a web browser to a website; or displaying a location on a map.

6. The computer-implemented method of claim 4, wherein the extracted data comprises a position of the recognized subject matter, the position comprising an area on the image that the recognized subject matter approximately occupies.

7. The computer-implemented method of claim 6, further comprising:
displaying the image with at least a part of the extracted data, wherein the tag of the recognized subject matter is displayed when a user pointer is moved in proximity to the position of the recognized subject matter, the tag including textual data associated with a recognized subject matter.

8. The computer-implemented method of claim 6, further comprising:
displaying the image with at least a part of the extracted data, wherein the action associated with the recognized subject matter is performed in response to receiving a user selection within the position associated with the recognized subject matter.

9. The computer-implemented method of claim 1, further comprising:
receiving user input to modify at least a part of the extracted data; and
sending the extracted data to the image analyzer.

10. One or more non-transitory computer-readable media storing instructions that are executable by one or more processors to perform operations comprising:
receiving an image;
determining context data associated with the image;
storing the image and the context data in a local database;
sending the image and the context data to an image analyzer service, wherein the image analyzer service determines extracted data based on:
the image,
the context data, and
a user profile that includes user preferences specifying types of data that are to be extracted from the image;
receiving, from the image analyzer service, extracted data associated with the image, the extracted data comprising a type of a recognized subject matter included in the image, a tag associated with the recognized subject matter, and an action associated with the recognized subject matter;
reducing a size of the image to create a thumbnail of the image by performing at least one of downsampling the image, cropping the image, or reducing a number of colors in the image;
associating and storing the extracted data with the thumbnail in the local database;
receiving a query;
displaying results of the query, the results extracted from the local database.

11. The one or more non-transitory computer-readable media of claim 10, wherein the image analyzer service determines extracted data based on information from other data sources, including one or more of a social media database, a company directory, a map database, a website, an image library, or a news feed.

12. The one or more non-transitory computer-readable media of claim 10, wherein the image analyzer service determines that the image includes a URL by matching text recognized in the image against a regular expression.

13. The one or more non-transitory computer-readable media of claim 10, wherein the image analyzer service stores images from users in user-specific databases.

14. The one or more non-transitory computer-readable media of claim 10, wherein the image analyzer service maintains accounts associated with users including user preference data and user history data, and determines extracted data based on at least one of the user preference data or the user history data.

15. The one or more non-transitory computer-readable media of claim 14, wherein the image analyzer service determines extracted data for a first image associated with a first user based on a second image associated with a second user or extracted data associated with the second image.

16. The one or more non-transitory computer-readable media of claim 12, wherein the image analyzer service validates the URL and obtains a risk rating for the URL.

17. A computer device, comprising:
one or more processors; and
one or more non-transitory computer-readable media storing instructions that are executable by the one or more processors to perform operations comprising:
capturing an image;
determining context data associated with the image;
storing the image and the context data in a local database;
sending the image and the context data to an image analyzer, wherein the image analyzer determines extracted data based on:
the image;
the context data; and
a user profile specifying types of data that are to be extracted from the image;
reducing a size of the image to create a thumbnail of the image by performing at least one of downsampling the image, cropping the image, or reducing a number of colors in the image;
receiving from the image analyzer extracted data associated with the image, the extracted data comprising a type of recognized subject matter included in the image, a tag associated with the recognized subject matter, and an action associated with the recognized subject matter;
associating and storing the extracted data with the thumbnail in the local database;
receiving a query directed to the local database; and
displaying results of the query, the results extracted from the local database.

18. The computer device of claim 17, the one or more non-transitory computer-readable media storing further instructions that are executable by the one or more processors to:
determining parameters from the query, the parameters comprising one or more of a search context data or a search tag;
determining the results of the query based on the parameters;
ranking the results according to a rank criteria.

19. The computer device of claim 18, wherein the rank criteria is based on a relevance score based on the query parameters and context data or tags associated with images in the results.

20. The computer device of claim 18, wherein the rank criteria is based on user preference data.

* * * * *